(12) United States Patent
Garner et al.

(10) Patent No.: US 12,203,565 B2
(45) Date of Patent: Jan. 21, 2025

(54) VALVE REMOVAL PLUG WITH QUICK LATCH CONNECTION

(71) Applicant: Baker Hughes Oilfield Operations LLC, Houston, TX (US)

(72) Inventors: Detrick Garner, Tomball, TX (US); Paul Cody, Houston, TX (US); Nathan Burcham, Houston, TX (US); Melvin Medina, Spring, TX (US); Kuber Sullad, Bangalore (IN)

(73) Assignee: Baker Hughes Oilfield Operations LLC, Houston, TX (US)

( * ) Notice: Subject to any disclaimer, the term of this patent is extended or adjusted under 35 U.S.C. 154(b) by 137 days.

(21) Appl. No.: 18/116,498

(22) Filed: Mar. 2, 2023

(65) Prior Publication Data

US 2024/0295278 A1 Sep. 5, 2024

(51) Int. Cl.
*F16K 43/00* (2006.01)
*E21B 34/02* (2006.01)
*F16L 55/11* (2006.01)

(52) U.S. Cl.
CPC ........ *F16K 43/001* (2013.01); *F16L 55/1133* (2013.01); *E21B 34/02* (2013.01)

(58) Field of Classification Search
CPC ..... F16K 43/001; F16L 55/1133; E21B 34/02
See application file for complete search history.

(56) References Cited

U.S. PATENT DOCUMENTS

| | | | |
|---|---|---|---|
| 6,695,049 B2 | 2/2004 | Ostocke | |
| 8,844,638 B2 | 9/2014 | Thornburrow | |
| 10,502,021 B2 | 12/2019 | Healy | |
| 11,060,375 B2 | 7/2021 | Shirley | |
| 2012/0305237 A1 | 12/2012 | Thornburrow | |
| 2014/0216757 A1* | 8/2014 | Kleppa | E21B 34/02 166/377 |
| 2017/0044861 A1* | 2/2017 | Guedes | E21B 34/02 |
| 2018/0179854 A1 | 6/2018 | Healy | |

(Continued)

FOREIGN PATENT DOCUMENTS

CN 217925778 U 11/2022

OTHER PUBLICATIONS

Qihang Wellhead, "Wellhead component valve removal plugs-VR plugs," Mar. 2, 2023, http://www.qihangwellhead.com, 4 pages.

(Continued)

*Primary Examiner* — Kevin R Barss
(74) *Attorney, Agent, or Firm* — Baker Hughes Patent Organization

(57) ABSTRACT

In at least one embodiment, a valve removal (VR) system for an oilfield equipment includes a VR plug having a first surface and a second surface. The VR system includes a bushing to be removably associated with the first surface. The bushing is to extend, at least partly, beyond the second surface of the VR plug. The bushing is also to contact an inner surface of a valve of the oilfield equipment and to prevent the second surface from contacting the inner surface of the valve. The VR system includes a guiding rod to be associated with the VR plug to support guidance of the VR plug through the valve of the oilfield equipment. The guiding rod is also to be disassociated from the VR plug to support removal of the guiding rod from the valve with the VR plug remaining in the oilfield equipment.

20 Claims, 8 Drawing Sheets

(56) References Cited

U.S. PATENT DOCUMENTS

2019/0040709 A1    2/2019  Garner et al.
2021/0285302 A1    9/2021  Dalinger
2022/0170343 A1*   6/2022  Brodie .................... E21B 34/02

OTHER PUBLICATIONS

International Search Report and Written Opinion issued in PCT Application No. PCT/US2024/017206, mailed Jun. 24, 2024 (9 pages).

* cited by examiner

VALVE REMOVAL PLUG WITH QUICK LATCH CONNECTION

BACKGROUND

1. Technical Field

This disclosure relates generally to oilfield equipment and more particularly to systems and methods for valve removal (VR) plugs with quick latch connection.

2. Description of the Prior Art

Oilfield equipment, such as wellheads, that are subject to leaching and may be equipped with a horizontally oriented outlet connection and with a valve removal prep that may be varying sizes depending on use cases, including for 4 1/16-inches for low pressure applications and up to 9-inches in certain other applications. The leaching (also referred to as solution mining) may be performed to mine underground salt deposits to create a cavern to store natural resources. A volume flow rate is critical in a solution for mining. As a result, a large bore at an outlet connection may be needed to achieve the volume flow rate. In some applications, a 9-inch nominal bore may be used and this may require a specially sized VR plug for the outlet connection. This is so that it may enable changing out of valves, such as for purposes of repairing the valves. As such, a VR plug may be of larger diameters and may have heavier mass. In comparison, some smaller VR plugs use a connection with an o-ring in its application; whereas, a larger VR plug may need a secured connection to support a substantially larger weight. The larger size and weight may lead to risks, such as unintentional disconnection from an installation/removal tool inside a valve if the VR plug is not secured. Such a risk may lead to expensive and time-consuming requirements for specialized services to retrieve a VR plug. This incurs non-productive down time and affects rig/drilling schedules.

SUMMARY

In at least one embodiment, a valve removal (VR) system for an oilfield equipment is disclosed. The VR system includes a VR plug having a first surface and a second surface. The VR system further includes at least one bushing to be removably associated with the first surface. The at least one bushing is to extend, at least partly, beyond the second surface of the VR plug. The at least one bushing is also to contact an inner surface of a valve of the oilfield equipment and to prevent the second surface from contacting the inner surface of the valve. The VR system includes a guiding rod to be associated with the VR plug to support guidance of the VR plug through the valve of the oilfield equipment. The guiding rod is also to be disassociated from the VR plug to support removal of the guiding rod from the valve with the VR plug remaining in the oilfield equipment.

In at least one embodiment, a method for a valve removal (VR) system to be used with an oilfield equipment is also disclosed. The method includes providing a VR plug as part of the VR system, where the VR plug includes a first surface and a second surface. The method includes removably associating at least one bushing with the first surface of the VR plug. The at least one bushing is to extend, at least partly, beyond the second surface of the VR plug. The the at least one bushing is further to contact an inner surface of a valve of the oilfield equipment and to prevent the second surface from contacting the inner surface of the valve. The method includes enabling a guiding rod of the VR system to be associated with the VR plug to support guidance of the VR plug through the valve of the oilfield equipment. Further, the method includes enabling the guiding rod to be disassociated from the VR plug to support removal of the guiding rod from the valve with the VR plug remaining in the oilfield equipment.

In at least one embodiment, a method for an operation on a valve in an oilfield equipment is disclosed. The method includes attaching at least one bushing to a VR plug that has a first surface and a second surface. The at least one bushing is attached to the first surface of the VR plug and the at least one bushing extends, at least partly, beyond the second surface of the VR plug. The method includes attaching a guiding rod with the VR plug by a press-fitting. The method further includes enabling adjustments to the press-fitting. The method includes guiding the VR plug through the valve of the oilfield equipment, where the at least one bushing contacts an inner surface of a valve of the oilfield equipment and where the second surface is prevented from contacting the inner surface of the valve. The method includes enabling the press-fitting to be deactivated to disassociate the guiding rod from the VR plug with the VR plug remaining in the oilfield equipment.

BRIEF DESCRIPTION OF DRAWINGS

Some of the features and benefits of the present disclosure having been stated, others will become apparent as the description proceeds when taken in conjunction with the accompanying drawings, in which.

Figure 1:
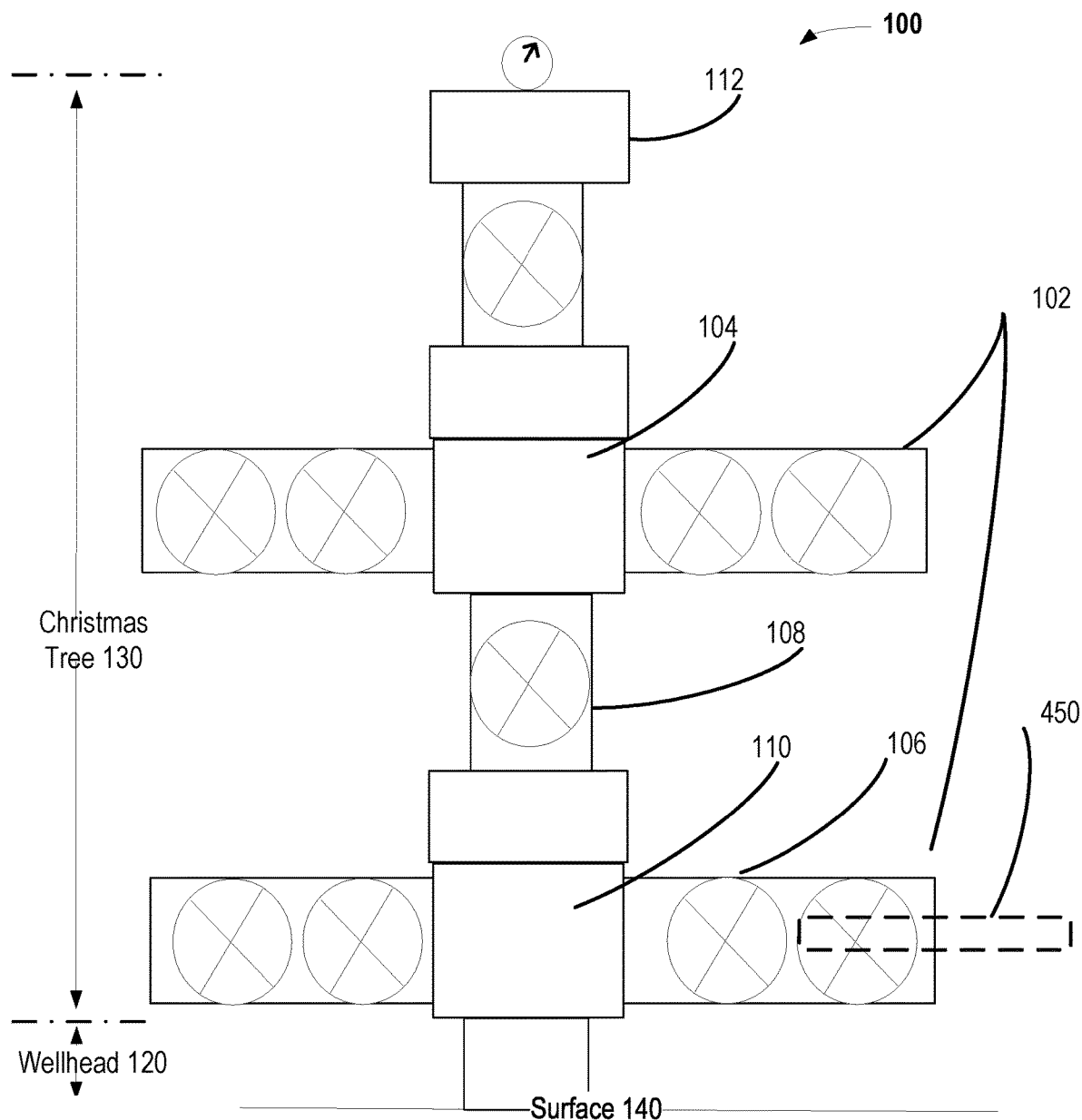
FIG. 1 is a block diagram of certain oilfield equipment that is subject to an operation on a valve using a valve removal (VR) system as detailed herein and in accordance with at least one embodiment.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

In at least one embodiment, to resolve issues described above to improve reliability of a connection between a VR plug and its tool, as well as its design to support movement through a wellhead of an oilfield equipment using integrated installation/removal process features. For example, a VR plug may be a threaded device that can be operated in an oilfield equipment, such as in a connection outlet of a wellhead or a Christmas tree to enable removal of gate valves under pressure. A VR plug may be installed and retrieved using a plugging tool (also referred to as a "sidedoor" lubricator). The VR plug may be part of a VR system, along with a guiding rod and the lubricator.

The VR plug may be made up with industry standardized dimensions to be used in valve removal operations. Although there may be some industry standardizations, customized VR plugs may exist of different dimensions or features for different types of oilfield equipment and applications. In at least one embodiment, VR plugs may be used in special operations, such as excavating underground salt domes that will be used to store hydrocarbon.

The VR system may be used to repair valves for maintenance and may be used in an oilfield equipment having valve removal prep applied prior to use. The VR system includes a VR plug and a guiding rod (also referred to as a VR tool herein). In at least one embodiment, a removable association or connection between the VR plug and the guiding rod or VR tool uses one or more spring ball plungers (spring-loaded features) to lock within one or more grooves of a VR plug. The spring-loaded features (if multiple ones are used) may be that spaced radially on an outer diameter of the guiding rod.

The VR plug may include a male hex drive which stabs into female connection within a valve of an oilfield equipment as part of an operation within the oilfield equipment. The spring-loaded features help guide and center the VR plug. After aligning between the VR plug and the guiding rod, the connection may be further secured by the spring-loaded features that may snap into a groove horizontal to the spring-loaded features. This is to prevent unintentional connection separation. Then, load or tension of the spring-loaded features can be adjusted by a tensioning feature. For example, each of the spring ball plungers may be associated with a tensioning feature, such as a screw. Adjustments to the screw can reduce or increase tension of the plungers into or out of the grooves. Further, the screws may be removed to enable replacing of the spring-loaded features with those of different load rating. The spring-loaded features also allow for a user to check whether the valve removal has thread engagement without disconnecting.

In at least one embodiment, a VR plug herein has a self-energized elastomer seal. As such, there is no need to make up the VR plug to the oilfield equipment to specified torque. This directly addresses and mitigates a risk of the VR plug getting stuck if left undisturbed for long periods, especially in a use case where relatively large threads are at issue. A user or operator of the VR system can back off, such as by a half-turn, for the VR plug, after making up tightly. This approach may be used to prevent leaks from improper operation of the VR plug.

In at least one embodiment, a VR plug herein includes at least one bushing. The at least one bushing may be made of fluoropolymer, Polyether Ether Ketone (PEEK), nylon, or a plastic comprising low coefficient of friction. The bushing is a guided ring that is designed to have close fit to a valve bore. This allows the VR plug to be centered to mitigate possibility of damaging or obstructing the valve bore during installation or removal of the VR plug as the lubricator travels through valve bore(s).

In at least one embodiment, the removable association of a VR plug and a guiding rod described herein may be used with VR plugs of various sizes, including with smaller standard VR plug that may be lighter, as readily understood to a skilled artisan upon reading the present disclosure. An o-ring may be used to secure the VR plug at the connection with the guiding rod but may need to be replaced to adjust for life span. While smaller and standard VR plugs have also been known to disconnect from the guiding rod, the use of a tensioning feature herein can be beneficial to prevent such disconnections. As a result, expensive rig operations due to added non-productive rig down-time is avoided.

In at least one embodiment, the VR system herein is also able to issues related to making-up the VR plug to a specified torque. For example, a much higher breakout torque may be required to un-make the connection and to retrieve the VR plug after the VR plug has been installed and subjected to pressure. A problem from such torque requirements is that there is a risk that while retrieving the VR plug, using a side door lubricator, certain types of VR plugs may not be equipped with a sufficient torque-rating that is strong enough to achieve a higher breakout torque required for removal. Although there may be adequate capacity for installation, an operator may have limited tools to troubleshoot a stuck VR plug, compared to similar sibling products, such as tubing plugs. Relative to a VR plug, a tubing plug may be run vertically downhole where different rig tools solutions are available to break free a stuck/high torque valve tubing plug.

In at least one embodiment, a bushing or guided ring of the VR plug keeps the VR plug centered within the horizontal bore of a spool/head connection outlets of an oilfield equipment as it travels through valve bores mated to a spool/head side connection outlet. For larger valves, a bore may be longer and may require a side outlet plugging tool (or guiding rod) with a significantly longer than normal stroke. Further, a heavy VR plug may displace from a main centerline of a valve bore due to gravity as it drifts through the valve bores. The heavy VR plug may drag along a bottom of a valve bore(s) if it were to drift enough. To prevent this from occurring, the bushing described herein provides a close fit intended to absorb any contact friction as the VR plug attempts to contact the valve bore(s). The bushing also keeps the VR plug centered during its journey through the valve bore(s) to prevent it from getting stuck, and to prevent the risk of metal-to-metal contact damage that could occur within the valve internal components.

FIG. 1 is a block diagram of oilfield equipment 100 that is subject to an operation on a valve using a valve removal (VR) system as detailed herein and in accordance with at least one embodiment. The oilfield equipment 100 may include a Christmas tree 130 over a wellhead 120 located at or about a surface layer 140. Valves subject to valve removal and related operations may be included on one or more branches 102 of the oilfield equipment 100.

Further, as illustrated in FIG. 1, oilfield equipment may include a top connector 112 that is connected at a top of a studded cross 104. There may be multiple flow line gate valves and multiple kill line gate valves, generally illustrated as valves 106. These valves 106 may be on opposite sides of a studded cross 104. Further, the oilfield equipment may include one or more master gate valves 108, such as an upper and a lower master gate valve. A tubing head adapter may be connected between a tubing head 110 and at least one of the master gate valves 108. In at least one embodiment, a VR system 450 may be used to perform operations include replacement of a valve 106, including replacement of a branch 102 having one or more valves 106.

Figure 2:
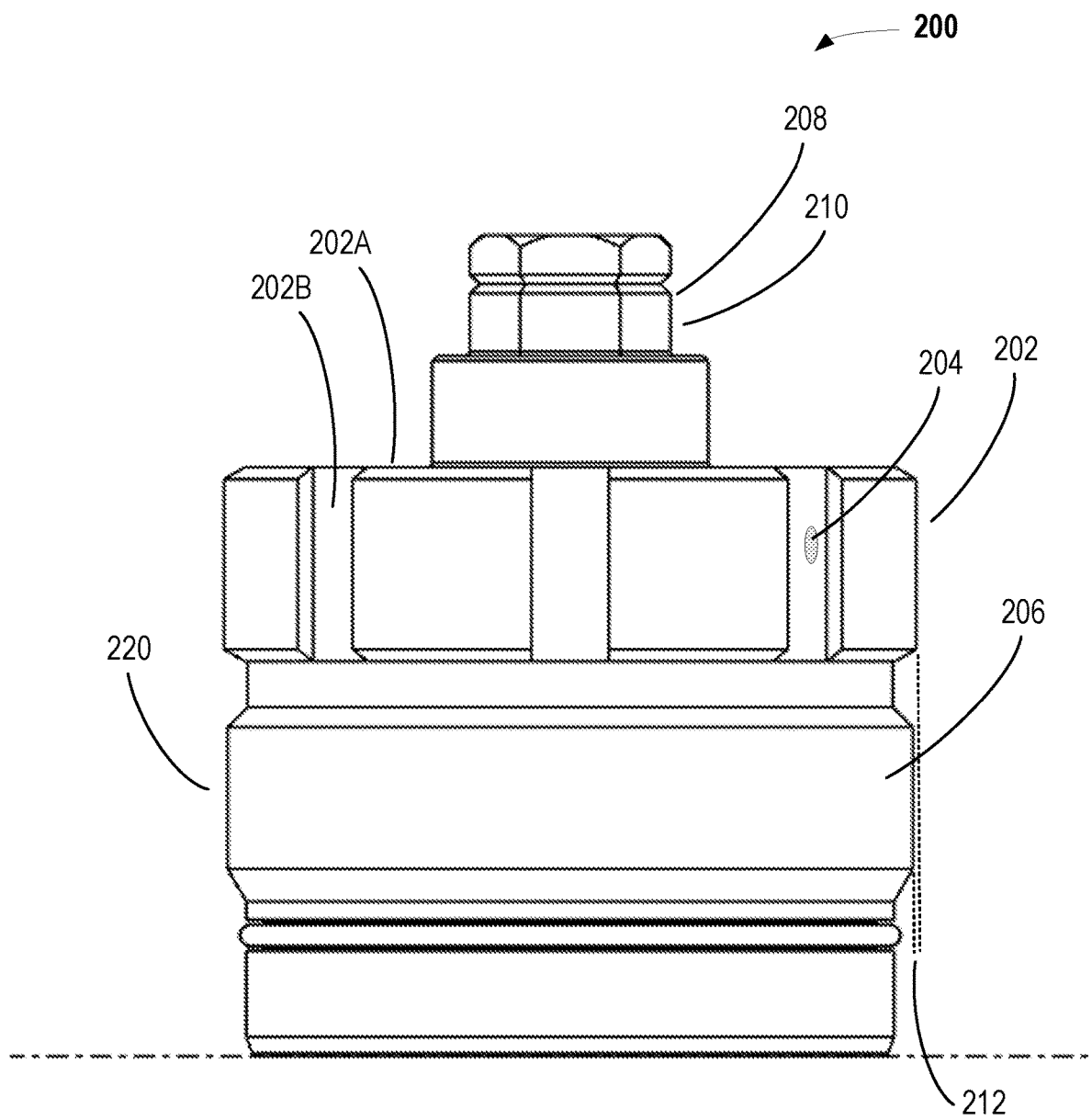
FIG. 2 is a side view of aspects of a VR plug of a VR system in accordance with at least one embodiment.

FIG. 2 is a side view of aspects 200 of a VR plug 220 of a VR system in accordance with at least one embodiment. The VR plug 220 includes at least one neck 210 having at least one groove 208. Even though illustrated as circumferential, this is not limiting as there may be sectioned grooves in at least symmetric positions around the neck 210 of the VR plug 220. The at least one groove 208 is to receive at least one ball of a guiding rod as part of an association between the VR plug 220 and a guiding rod, such as illustrated further in FIGS. 2-4B. In addition, the association between the VR plug 220 and the guiding rod can be a press-fit association by virtue of at least one ball or other spring-loaded feature tensioning against the groove.

Figures 3A, 3B:
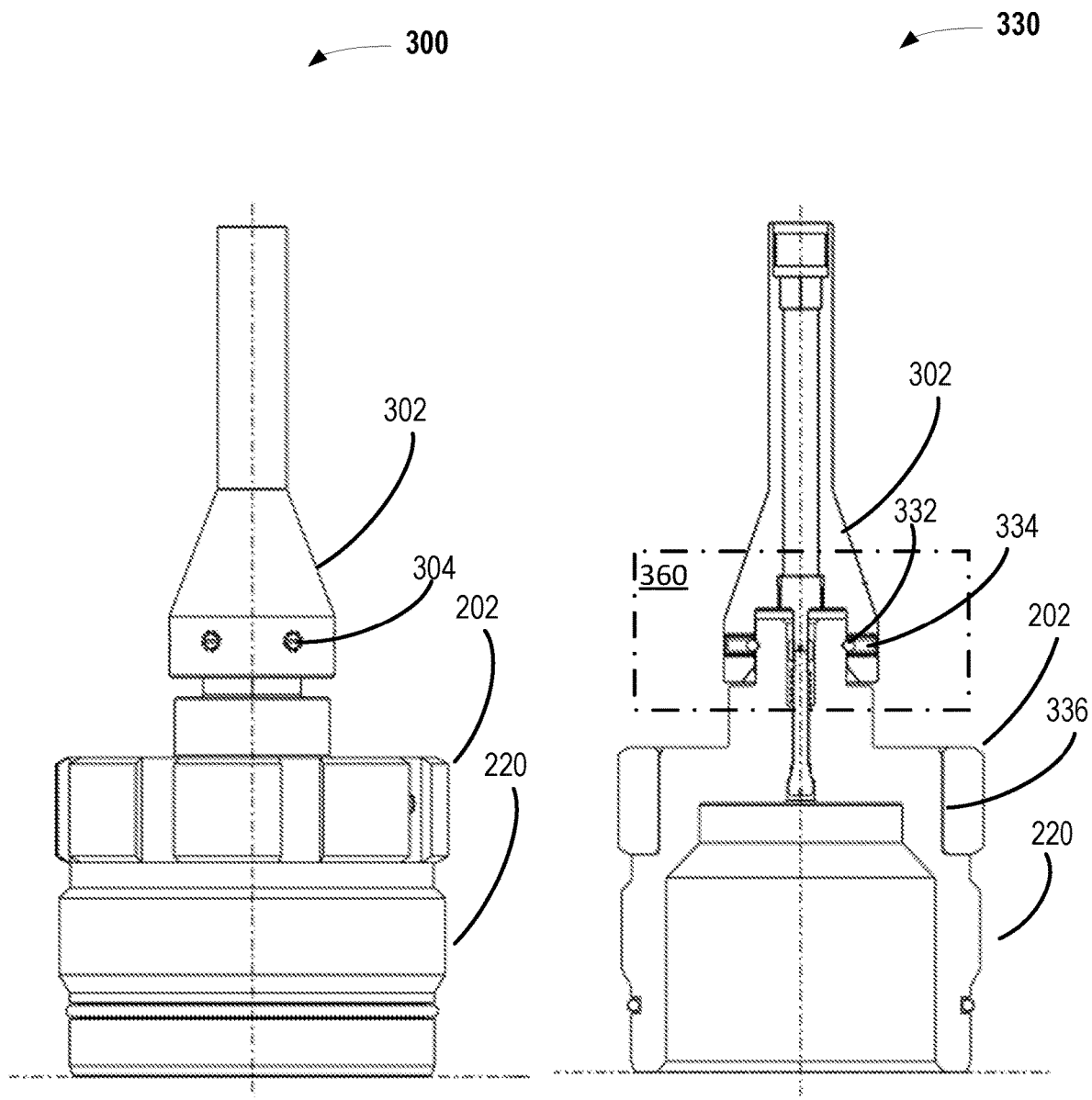
FIG. 3A is a side view of aspects of a VR plug that is removably associated with a guiding rod, in accordance with at least one embodiment.
FIG. 3B is a cross-sectional view of aspects of a VR plug that is removably associated with a guiding rod, in accordance with at least one embodiment.

FIG. 2 also illustrates that the VR plug 220 of a VR system includes at least one bushing 202 that can be removably associated with a first surface of the VR plug 220. The first surface is illustrated in FIG. 3B as surface 336. The at least one bushing 202 can extend, at least partly, beyond a second surface 206 of the VR plug 220 and, therefore, a clearance 212 exists between the second surface 206 and an inner surface of a valve 106 or branch 102 when the VR plug 220 moves through the inner surface. Further, the at least one bushing 202 can contact the inner surface of a valve of the oilfield equipment 100 and can prevent the second surface 206 from contacting the inner surface of the valve because of at least the clearance 212.

In at least one embodiment, the at least one bushing 202 includes raised features 202A to provide the contact with the inner surface of the valve. The at least one bushing 202 also includes indent features 202B to receive at least one fixture 204 for the removable association between the at least one bushing 202 and the VR plug 220.

FIG. 3A is a side view of aspects 300 of a VR plug that is removably associated with a guiding rod 302, in accordance with at least one embodiment. The guiding rod 302 may be associated with the VR plug 220 to support guidance of the VR plug 220 through the valve of the oilfield equipment 100. Further, the guiding rod 302 can be disassociated from the VR plug 220 to support removal of the guiding rod 302 from the valve, with the VR plug 220 remaining in the oilfield equipment 100.

FIG. 3B is a cross-sectional view of aspects 330 of a VR plug that is removably associated with a guiding rod 302, in accordance with at least one embodiment. FIG. 3B also illustrates one or more spring-loaded features 332, 334 of the guiding rod 302. A spring-loaded feature 332, 334 may be a ball and spring within a channel of the guiding rod 302. The spring-loaded feature 332, 334 can be associated with a groove 208 of the VR plug 220. The spring-loaded feature 332, 334 can enable the association between the VR plug 220 and the guiding rod 302 by a press-fit.

In at least one embodiment, the spring-loaded feature 332, 334 can enable the disassociation between the VR plug 220 and the guiding rod 302 by an axial tension on the guiding rod 302. Further, the axial tension causes the spring-loaded feature 332, 334 to be removed from the groove of the VR plug as the spring is caused to retract and the ball or other locking feature of the spring-loaded feature retracts as well.

In at least one embodiment, FIG. 3 also illustrates a tensioning feature 304 that is associated with a spring-loaded feature 332, 334 of the guiding rod 302. The tensioning feature 304 can be used to cause a threshold level of press-fit or tension between the spring-loaded feature 332, 334 (such as between ball 332) and a groove 208 of the VR plug 220. The threshold level of press-fit or tension may be associated with an axial tension that is used or required to enable the disassociation of the guiding rod 302 from the VR plug 220.

In at least one embodiment, a VR system that includes the VR plug 220 uses at least one bushing 202 that is circumferential. However, individual bushings with a receiving indent or hole for a fixture 204 may be used instead of requiring a circumferential bushing 202 having raised features and indentations. There may be association features, such as via the fixture 204, to enable the removable association between the bushing 202 and the VR plug.

In at least one embodiment, a VR system that includes the VR plug 220 uses at least one bushing 202 that has an internal adapter that is to associate the at least one bushing with the VR plug. For example, the bushing 202 may be screwed over the top of the VR plug 220 via an adapter removable attached to the VR plug 220. This allows the bushing to be used with various different VR plugs of different sizes an also allows the VR system to be used in different sized valve bores.

Figure 3C:
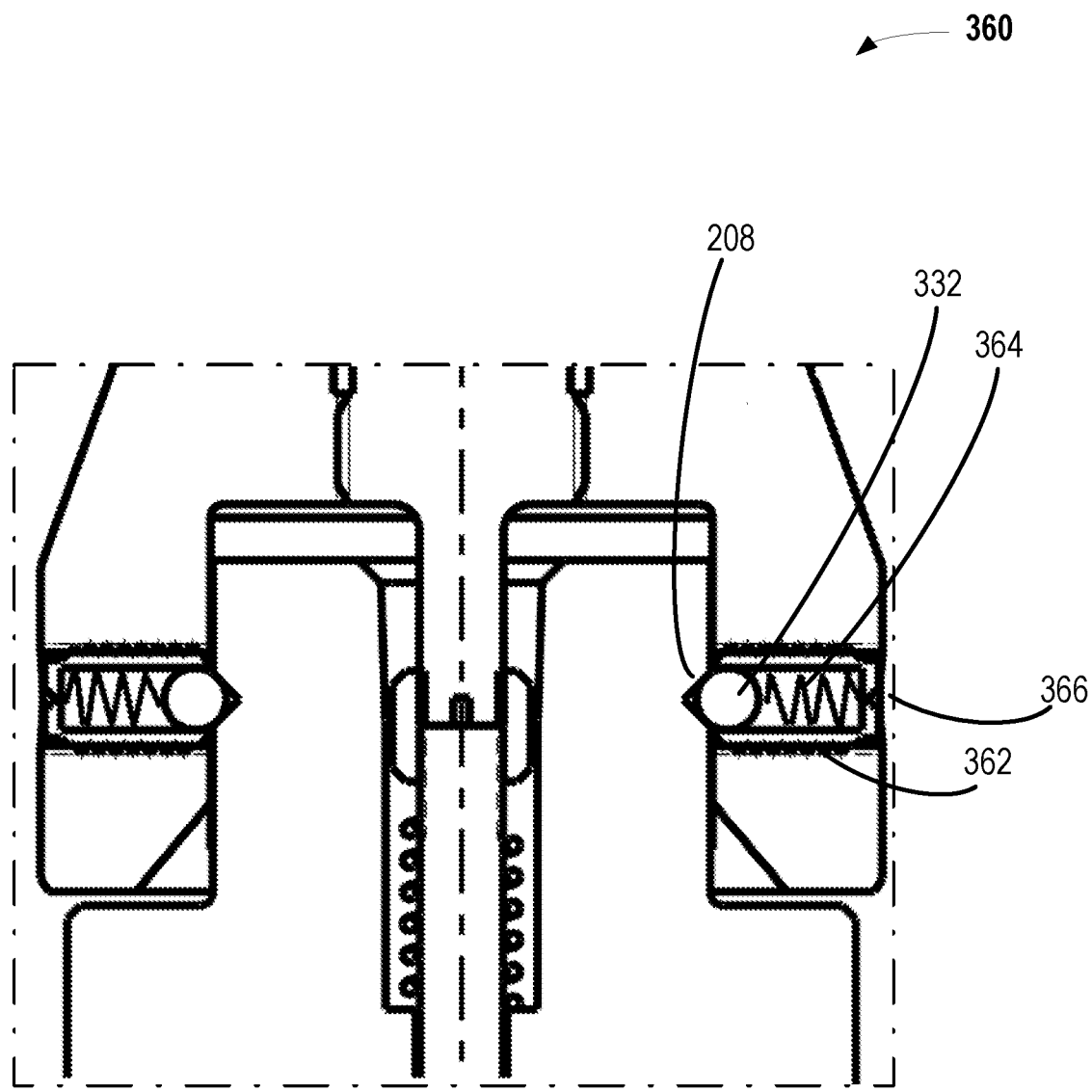
FIG. 3C is a cross-sectional view of a section showing details of a removable association between a VR plug and a guiding rod, in accordance with at least one embodiment.

FIG. 3C is a cross-sectional view of a section 360 showing details of a removable association between a VR plug and a guiding rod, in accordance with at least one embodiment. In at least one embodiment, a spring-loaded feature may a ball 332 and a spring 364 within a channel 362 of the guiding rod 302. The spring 364 may be coupled to the tension feature 304 to enable adjusting for the tensioning feature. For example, the tension feature may be a screw that screws into the channel 362 to cause a threshold level of press-fit between the spring-loaded feature 332 and the groove 208 of the VR plug 220. The threshold level may be associated with an axial tension to enable the disassociation of the guiding rod 302 from the VR plug 220.

In at least one embodiment, however, the screw may be withdrawn from the channel 362 to reduce the press-fit from the threshold level of press-fit for the spring-loaded feature 332. In at least one embodiment, the spring 362 may be free and not fixed inside the channel 362 and may be replaceable to increase the tension on the spring-loaded feature 332.

Figure 4A:
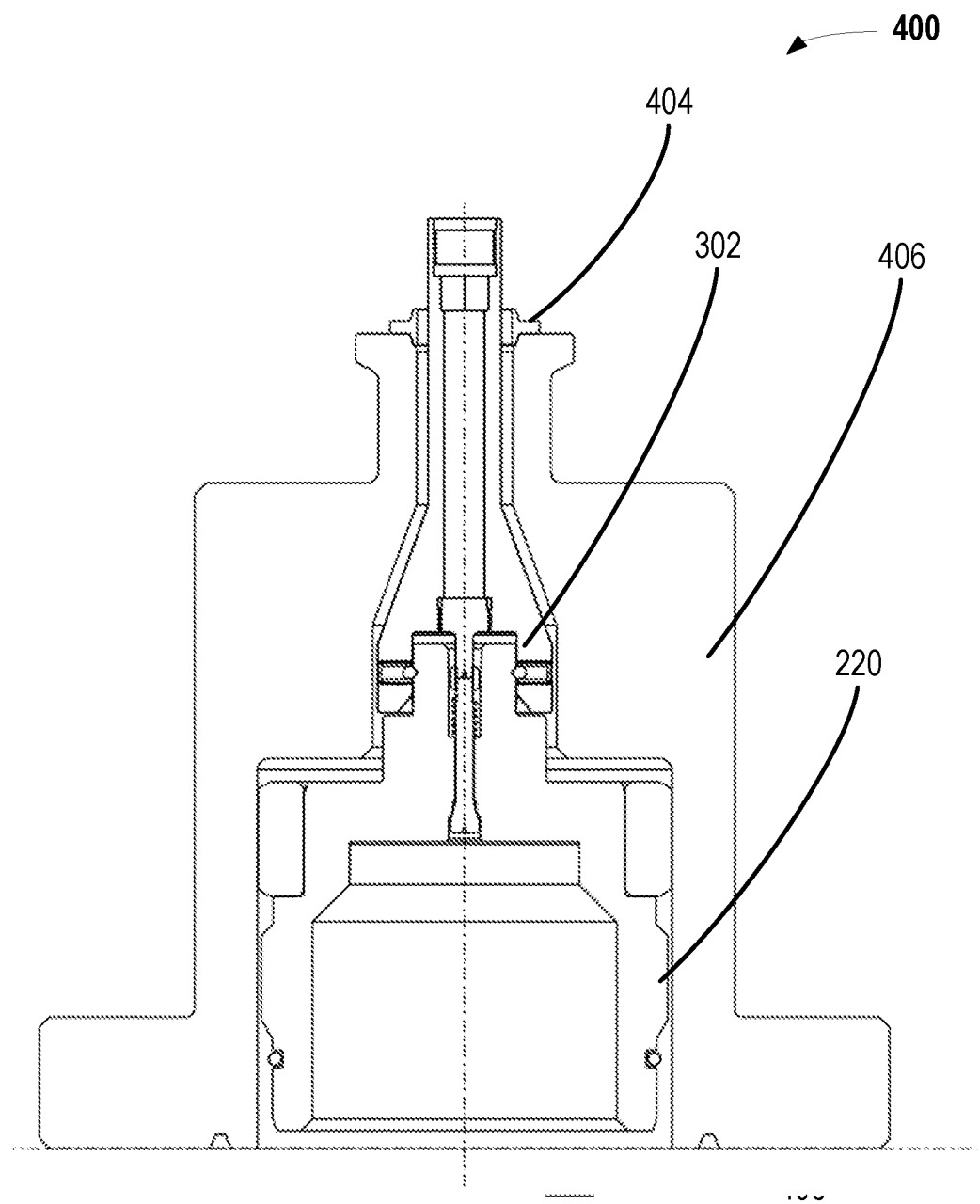
FIG. 4A is a cross-sectional view of aspects of a VR plug associated with a guiding rod and an adapter, in accordance with at least one embodiment.

FIG. 4A is a cross-sectional view of aspects 400 of a VR system associated with a guiding rod and an adapter, in accordance with at least one embodiment. For example, an adapter 406 may be associated with the VR plug 220 and the guiding rod 302. The adapter allows the VR plug 220 to extend out once the VR system is used in an operation for a valve in an oilfield equipment.

Figure 4B:
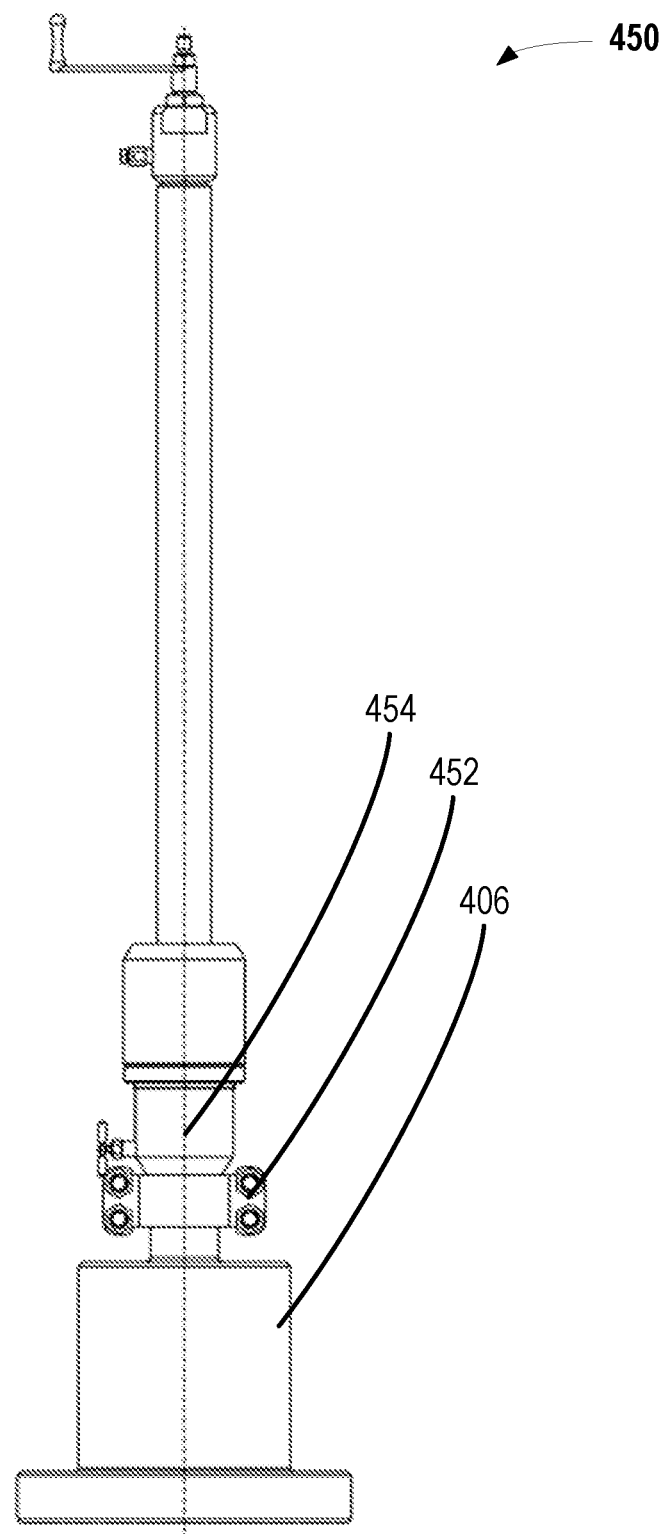
FIG. 4B is a cross-sectional view of aspects of a VR system having a lubricator, in accordance with at least one embodiment.

FIG. 4B is a cross-sectional view of aspects 450 of a VR system having a lubricator, in accordance with at least one embodiment. For example, a lubricator 454 may be associated with the VR system via the adapter 406. The lubricator 454 is assembled once the guiding rod 302 and the VR plug 220 are associated together and once the tensioning for the spring-loaded feature is provided. Once the VR plug 220 and the guiding rod 302 are locked to the lubricator 454, a clamp 452, such as a Gylock® clamp, may be used to secure the VR system in preparation to load the VR system into a valve bore.

Figure 5A:
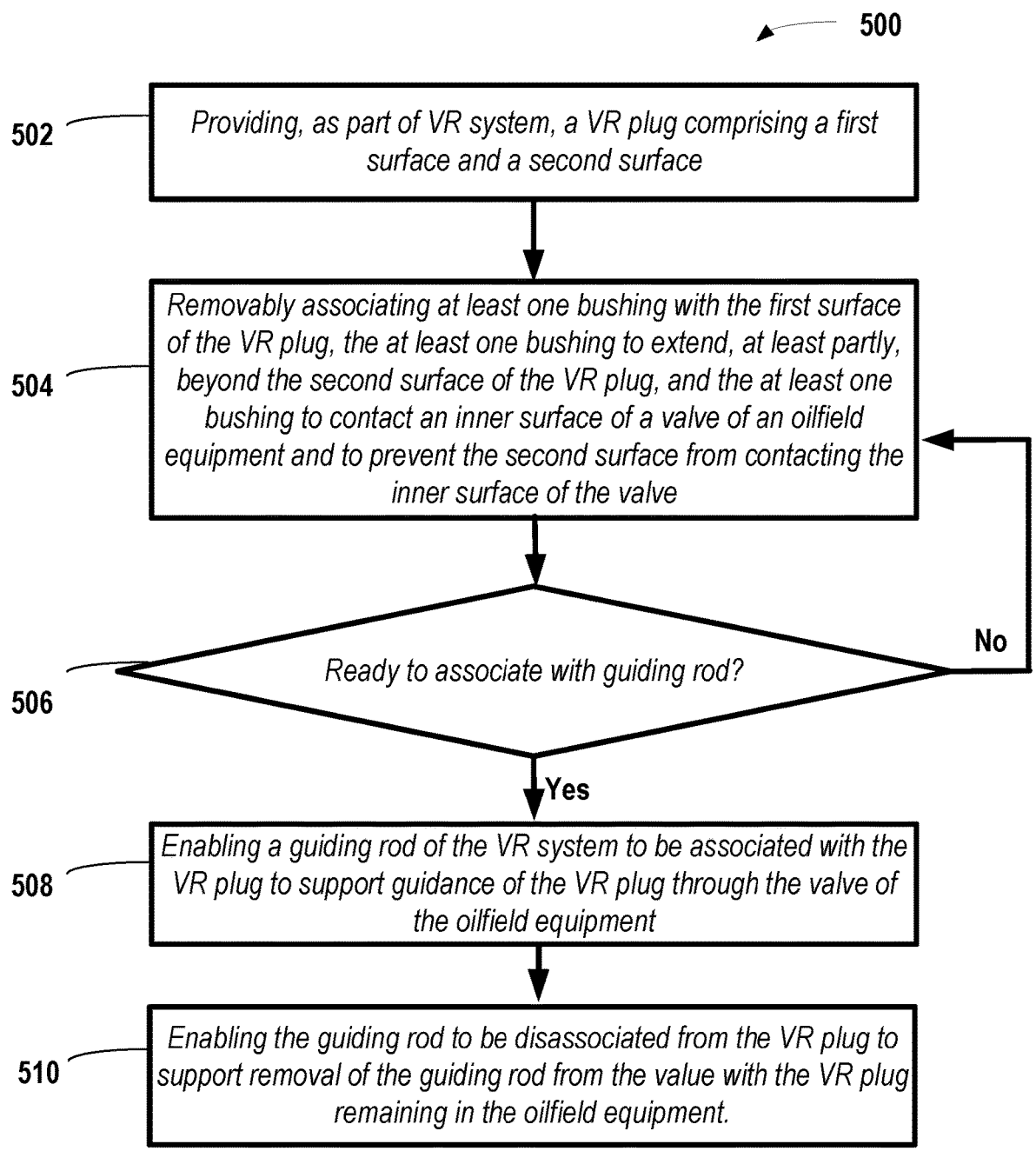
FIG. 5A is a flow diagram of a method for a VR system that is described at least in FIGS. 1-4B herein, in accordance with at least one embodiment.

FIG. 5A is a flow diagram of a method 500 for a VR system that is described at least in FIGS. 1-4B herein, in accordance with at least one embodiment. The method 500 is for VR system to be used with an oilfield equipment. The method includes providing (502), as part of the VR system, a VR plug having a first surface and a second surface. The method includes removably associating (504) at least one bushing with the first surface of the VR plug. The at least one bushing is to extend, at least partly, beyond the second surface of the VR plug. The at least one bushing is further to contact an inner surface of a valve of the oilfield equipment. In addition, the at least one bushing is to prevent the second surface from contacting the inner surface of the valve.

A verification (506) may be performed that the VR plug is read for association with the guiding rod. For example, aligning between the VR plug and the guiding rod may be performed. Once the verification (506) is positively progressed, the method 500 includes enabling (508) a guiding rod of the VR system to be associated with the VR plug to support guidance of the VR plug through the valve of the oilfield equipment.

For example, the association may be connection made by further securing spring-loaded features of the guiding rod with the VR plug, such that the spring-loaded features may snap into a groove horizontal to the spring-loaded features. This is to prevent unintentional connection separation. The method 500 further includes enabling (510) the guiding rod to be disassociated from the VR plug to support removal of the guiding rod from the valve, with the VR plug remaining in the oilfield equipment.

For example, as to step 510, load or tension of the spring-loaded features can be adjusted by a tensioning feature. Further, each of the spring ball plungers may be associated with a tensioning feature, such as a screw. Adjustments to the screw can reduce or increase tension of the plungers into or out of the grooves. Further, the screws may be removed to enable replacing of the spring-loaded features with those of different load rating. The spring-loaded features also allow for a user to check whether the valve removal has thread engagement without disconnecting. The tension on the spring-loaded features may also depend on the application and the axial tension required to cause the disassociation between the guiding rod and the VR plug, and this may be addressed in step 510.

In at least one embodiment, the method 500 may include a further step or a sub-step for providing at least one neck having a groove to receive at least one ball of the guiding rod as part of the association between the VR plug and the guiding rod. The association is a press-fit association. In at least one embodiment, the method 500 may include a further step or a sub-step for providing a spring-loaded feature of the guiding rod. The spring-loaded feature can be associated with a groove of the VR plug. The spring-loaded feature can enable the association between the VR plug and the guiding rod by a press-fit. The spring-loaded feature can enable the disassociation between the VR plug and the guiding rod by an axial tension on the guiding rod. The axial tension can cause the spring-loaded feature to be removed from the groove of the VR plug.

In at least one embodiment, the method 500 may include a further step or a sub-step for providing a tensioning feature associated with a spring-loaded feature of the guiding rod. Then, adjusting for the tensioning feature may be enabled to cause a threshold level of press-fit between the spring-loaded feature and a groove of the VR plug. Further, the threshold level may be associated with an axial tension to enable the disassociation of the guiding rod from the VR plug.

In at least one embodiment, the method 500 may include a further step or a sub-step for providing the at least one bushing to include of one or more of a fluoropolymer, Polyether Ether Ketone (PEEK), nylon, or a plastic comprising low coefficient of friction. In at least one embodiment, the method 500 may include a further step or a sub-step for providing the at least one bushing in a circumferential form. Then, the at least one bushing may include association features on an inside, via an adapter, or an outside, via fasteners or other fixtures, to enable the removable association with the VR plug.

In at least one embodiment, the method 500 may include a further step or a sub-step for providing the at least one bushing within raised features for the contact with the inner surface of the valve. In at least one embodiment, the method 500 may include a further step or a sub-step for providing the at least one bushing with indent features to receive at least one fixture for the removable association between the at least one bushing and the VR plug. In at least one embodiment, the method 500 may include a further step or a sub-step for providing the at least one bushing with an internal adapter that is to associate the at least one bushing with the VR rod.

Figure 5B:
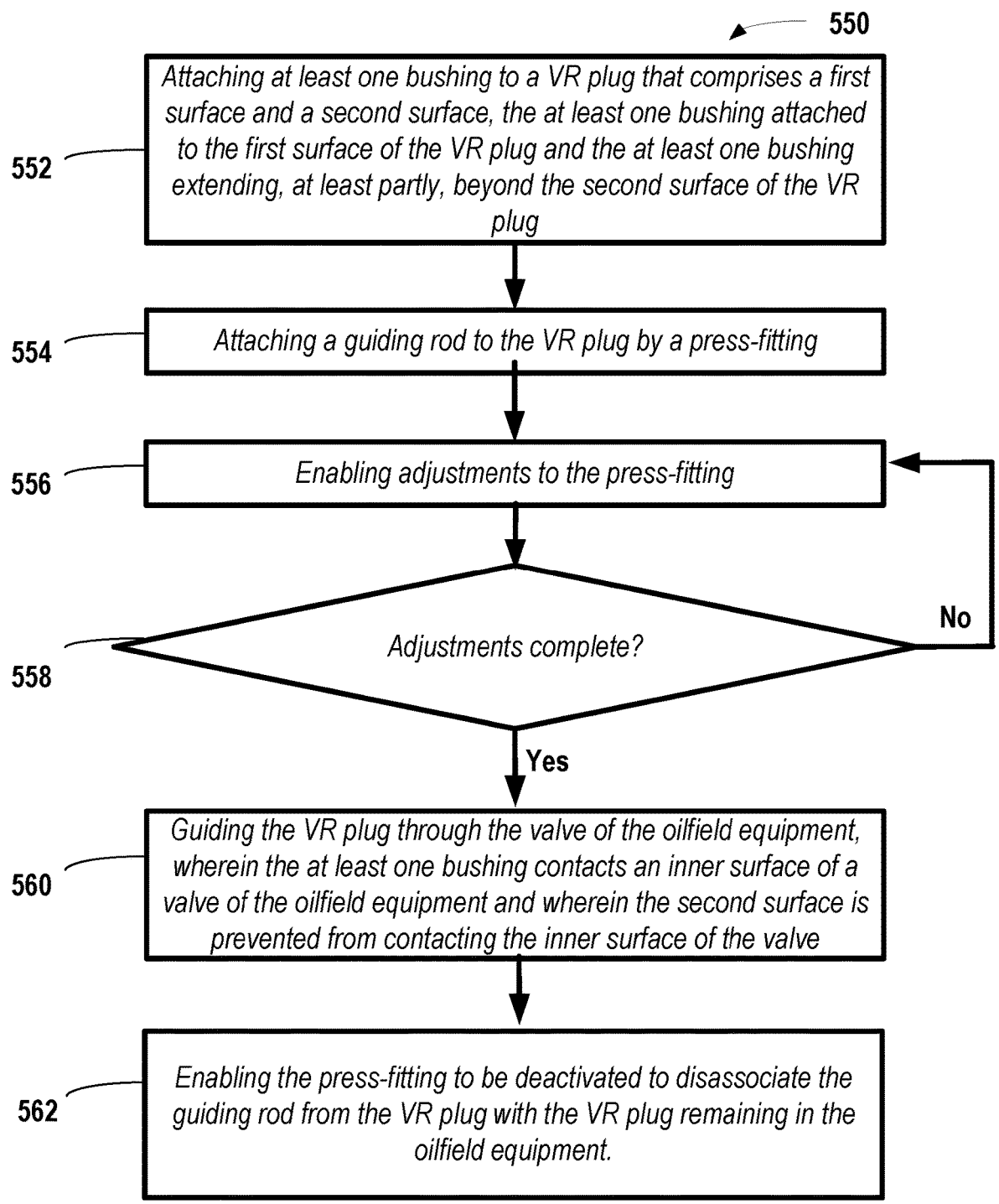
FIG. 5B is a flow diagram of a method for an operation on a valve using a VR system that is described at least in FIGS. 1-4B herein, in accordance with at least one embodiment.

FIG. 5B is a flow diagram of a method 550 for an operation on a valve using a VR system that is described at least in FIGS. 1-4B herein, in accordance with at least one embodiment. The method 550 may be for an operation on a valve in an oilfield equipment. The method 550 includes attaching (552) at least one bushing to a VR plug that has a first surface and a second surface. The at least one bushing may be attached to the first surface of the VR plug and the at least one bushing can extending, at least partly, beyond the second surface of the VR plug.

The method 550 includes attaching (554) a guiding rod to the VR plug by a press-fitting. The method 550 includes enabling (556) adjustments to the press-fitting. The adjustments here may be as described with respect to step 508 in FIG. 5A. The method 550 includes verifying (558) that the adjustments are complete. The method 550 includes guiding (560) the VR plug through the valve of the oilfield equipment. The at least one bushing then contacts an inner surface of a valve of the oilfield equipment. However, the second surface is prevented from contacting the inner surface of the valve because of the bushing providing a clearance. The method 550 includes enabling (562) the press-fitting to be deactivated to disassociate the guiding rod from the VR plug, with the VR plug remaining in the oilfield equipment. This may be by a predetermined axial force applied to the guiding road where the predetermined axial force is based in part on the tension associated with the spring-loaded feature.

In at least one embodiment, the method 550 may include a further step or a sub-step for enabling the press-fitting by a first axial tension between the VR plug and the guiding rod. In at least one embodiment, the method 550 may include a further step or a sub-step for enabling the deactivation of the press-fitting by a second axial tension between the VR plug and the guiding rod. In at least one embodiment, a relationship may be established between the first axial tension and the second axial tension. However, the first axial tension may be lesser than the second axial tension to enable more tension to cause disassociation between the guiding rod and the VR plug.

In at least one embodiment, the method 550 may include a further step or a sub-step for adjusting a tensioning feature associated with a spring-loaded feature of the guiding rod to cause the adjustments to the press-fitting. In at least one embodiment, the method 550 may include a further step or a sub-step for adjusting the tensioning feature by replacing a spring of the spring-loaded feature. This may be instead of screwing in or out a screw associated with the spring to cause the spring to compress or decompress against a ball, for instance.

While techniques herein may be subject to modifications and alternative constructions, these variations are within spirit of present disclosure. As such, certain illustrated embodiments are shown in drawings and have been described above in detail, but these are not limiting disclosure to specific form or forms disclosed; and instead, cover all modifications, alternative constructions, and equivalents falling within spirit and scope of disclosure, as defined in appended claims.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Recitation of ranges of values herein are merely intended to serve as a shorthand method of referring individually to each separate value falling within range, unless otherwise indicated herein and each separate value is incorporated into specification as if it were individually recited herein. In at least one embodiment, use of a term, such as a set (for a set of items) or subset unless otherwise noted or contradicted by context, is understood to be nonempty collection including one or more members. Further, unless otherwise noted or contradicted by context, term subset of a corresponding set does not necessarily denote a proper subset of corresponding set, but subset and corresponding set may be equal.

Conjunctive language, such as phrases of form, at least one of A, B, and C, or at least one of A, B and C, unless specifically stated otherwise or otherwise clearly contradicted by context, is otherwise understood with context as used in general to present that an item, term, etc., may be either A or B or C, or any nonempty subset of set of A and B and C. In at least one embodiment of a set having three members, conjunctive phrases, such as at least one of A, B, and C and at least one of A, B and C refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, terms such as plurality, indicates a state of being plural (such as, a plurality of items indicates multiple items). In at least one embodiment, a number of items in a plurality is at least two but can be more when so indicated either explicitly or by context. Further, unless stated otherwise or otherwise clear from context, phrases such as based on means based at least in part on and not based solely on.

In at least one embodiment, even though the above discussion provides at least one embodiment having implementations of described techniques, other architectures may be used to implement described functionality, and are intended to be within scope of this disclosure. In addition, although specific responsibilities may be distributed to components and processes, they are defined above for purposes of discussion, and various functions and responsibilities might be distributed and divided in different ways, depending on circumstances.

In at least one embodiment, although subject matter has been described in language specific to structures and/or methods or processes, it is to be understood that subject matter claimed in appended claims is not limited to specific structures or methods described. Instead, specific structures or methods are disclosed as example forms of how a claim may be implemented.

From all the above, a person of ordinary skill would readily understand that the tool of the present disclosure provides numerous technical and commercial advantages and can be used in a variety of applications. Various embodiments may be combined or modified based in part on the present disclosure, which is readily understood to support such combination and modifications to achieve the benefits described above.

It should be appreciated that embodiments herein may utilize one or more values that may be experimentally determined or correlated to certain performance characteristics based on operating conditions under similar or different conditions. The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art and are intended to be encompassed within the spirit of the present disclosure disclosed herein and the scope of the appended claims.

What is claimed is:

1. A valve removal (VR) system for oilfield equipment, comprising:
 a VR plug comprising a first surface and a second surface;
 at least one bushing to be removably associated with the first surface, the at least one bushing to extend, at least partly, beyond the second surface of the VR plug, and the at least one bushing to contact an inner surface of a valve of the oilfield equipment and to prevent the second surface from contacting the inner surface of the valve; and
 a guiding rod to be associated with the VR plug to support guidance of the VR plug through the valve of the oilfield equipment and to be disassociated from the VR plug to support removal of the guiding rod from the valve, with the VR plug remaining in the oilfield equipment.

2. The VR system of claim 1, further comprising:
 at least one neck comprising a groove to receive at least one ball of the guiding rod as part of the association between the VR plug and the guiding rod, wherein the association is a press-fit association.

3. The VR system of claim 1, further comprising:
a spring-loaded feature of the guiding rod, the spring-loaded feature to be associated with a groove of the VR plug, the spring-loaded feature to enable the association between the VR plug and the guiding rod by a press-fit, and the spring-loaded feature to enable the disassociation between the VR plug and the guiding rod by an axial tension on the guiding rod, wherein the axial tension causes the spring-loaded feature to be removed from the groove of the VR plug.

4. The VR system of claim 1, further comprising:
a tensioning feature associated with a spring-loaded feature of the guiding rod, the tensioning feature to cause a threshold level of press-fit between the spring-loaded feature and a groove of the VR plug, the threshold level associated with an axial tension to enable the disassociation of the guiding rod from the VR plug.

5. The VR system of claim 1, wherein the at least one bushing is comprised of one or more of a fluoropolymer, Polyether Ether Ketone (PEEK), nylon, or a plastic comprising low coefficient of friction.

6. The VR system of claim 1, wherein the at least one bushing is circumferential and comprises association features to enable the removable association with the VR plug.

7. The VR system of claim 1, wherein the at least one bushing comprises raised features to provide the contact with the inner surface of the valve and comprises indent features to receive at least one fixture for the removable association between the at least one bushing and the VR plug.

8. The VR system of claim 1, wherein the at least one bushing comprises an internal adapter that is to associate the at least one bushing with the VR plug.

9. A method for valve removal (VR) system to be used with an oilfield equipment, comprising:
providing, as part of the VR system, a VR plug comprising a first surface and a second surface;
removably associating at least one bushing with the first surface of the VR plug, the at least one bushing to extend, at least partly, beyond the second surface of the VR plug, and the at least one bushing to contact an inner surface of a valve of the oilfield equipment and to prevent the second surface from contacting the inner surface of the valve; and
enabling a guiding rod of the VR system to be associated with the VR plug to support guidance of the VR plug through the valve of the oilfield equipment and to be disassociated from the VR plug to support removal of the guiding rod from the valve, with the VR plug remaining in the oilfield equipment.

10. The method of claim 9, further comprising:
providing at least one neck comprising a groove to receive at least one ball of the guiding rod as part of the association between the VR plug and the guiding rod, wherein the association is a press-fit association.

11. The method of claim 9, further comprising:
providing a spring-loaded feature of the guiding rod, the spring-loaded feature to be associated with a groove of the VR plug, the spring-loaded feature to enable the association between the VR plug and the guiding rod by a press-fit, and the spring-loaded feature to enable the disassociation between the VR plug and the guiding rod by an axial tension on the guiding rod, wherein the axial tension causes the spring-loaded feature to be removed from the groove of the VR plug.

12. The method of claim 9, further comprising:
providing a tensioning feature associated with a spring-loaded feature of the guiding rod; and
enabling adjusting for the tensioning feature to cause a threshold level of press-fit between the spring-loaded feature and a groove of the VR plug, the threshold level associated with an axial tension to enable the disassociation of the guiding rod from the VR plug.

13. The method of claim 9, further comprising:
providing the at least one bushing to be comprised of one or more of a fluoropolymer, Polyether Ether Ketone (PEEK), nylon, or a plastic comprising low coefficient of friction.

14. The method of claim 9, further comprising:
providing the at least one bushing in a circumferential form, wherein the at least one bushing comprises association features to enable the removable association with the VR plug.

15. The method of claim 9, further comprising:
providing the at least one bushing within raised features for the contact with the inner surface of the valve; and
providing the at least one bushing with indent features to receive at least one fixture for the removable association between the at least one bushing and the VR plug.

16. The method of claim 9, further comprising:
providing the at least one bushing with an internal adapter that is to associate the at least one bushing with the VR rod.

17. A method for an operation on a valve in an oilfield equipment, the method comprising:
attaching at least one bushing to a VR plug that comprises a first surface and a second surface, the at least one bushing attached to the first surface of the VR plug and the at least one bushing extending, at least partly, beyond the second surface of the VR plug;
attaching a guiding rod to the VR plug by a press-fitting;
enabling adjustments to the press-fitting;
guiding the VR plug through the valve of the oilfield equipment, wherein the at least one bushing contacts an inner surface of a valve of the oilfield equipment and wherein the second surface is prevented from contacting the inner surface of the valve; and
enabling the press-fitting to be deactivated to disassociate the guiding rod from the VR plug, with the VR plug remaining in the oilfield equipment.

18. The method of claim 17, further comprising:
enabling the press-fitting by a first axial tension between the VR plug and the guiding rod; and
enabling the deactivation of the press-fitting by a second axial tension between the VR plug and the guiding rod.

19. The method of claim 17, further comprising:
adjusting a tensioning feature associated with a spring-loaded feature of the guiding rod to cause the adjustments to the press-fitting.

20. The method of claim 19, wherein the adjusting comprises replacing a spring associated with the spring-loaded feature.

* * * * *